Dec. 5, 1939.   K. POHLHAUSEN   2,182,640
ELECTRIC LOCOMOTIVE STRUCTURE
Filed Feb. 11, 1938   2 Sheets-Sheet 1

WITNESSES:

INVENTOR
Karl Pohlhausen.
BY
ATTORNEY

Dec. 5, 1939.　　　　K. POHLHAUSEN　　　　2,182,640
ELECTRIC LOCOMOTIVE STRUCTURE
Filed Feb. 11, 1938　　　2 Sheets-Sheet 2

WITNESSES:

INVENTOR
Karl Pohlhausen.
BY
ATTORNEY

Patented Dec. 5, 1939

2,182,640

UNITED STATES PATENT OFFICE 2,182,640

ELECTRIC LOCOMOTIVE STRUCTURE

Karl Pohlhausen, Berlin-Halensee, Germany, assignor to Westinghouse Electric & Manufacturing Company, East Pittsburgh, Pa., a corporation of Pennsylvania Application February 11, 1938, Serial No. 189,963
In Germany June 21, 1937

6 Claims. (Cl. 105—2)

My invention relates, generally, to electric locomotives and more particularly to devices for electric locomotives to suppress areodynamic stresses in the trolley wire.

In high speed vehicles the air streaming plays a very important role by reason of the increased speeds at which the vehicles operate. Particular difficulties arise in this connection for electric locomotives, which are usually so constructed that they may move in both directions. The present invention depends on the realization that, in the usual construction of high speed electric locomotives, the trolley wire arrangements and the collection of current from the wires are complicated by the comparatively unfavorable air streaming relationships because the trolley wire is lifted and considerable forces are exerted on the wire by the air deflected from the front end of the vehicle.

An object of the invention, generally stated, is to provide an electric locomotive suitable for high speed operation.

A more specific object of the invention is to prevent the lifting of a trolley wire by the air currents produced during high speed operation of an electric locomotive.

Other objects of the invention will be explained fully hereinafter or will be evident to those skilled in the art.

According to the invention, an essential improvement of the air streaming relationships between the vehicle and the trolley wire and with this a suppression of the lifting forces on the trolley wire is attained by so influencing the air streaming by auxiliary means on the vehicle that its course is approximately parallel to the trolley wire.

For a fuller understanding of the nature and objects of the invention, reference may be had to the following detailed description, taken in conjunction with the accompanying drawings, in which.

Figure 1:
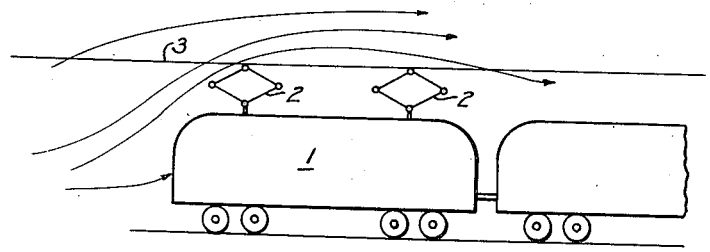
Figure 1 is a view, in side elevation of an electric locomotive, or vehicle, constructed in the usual manner.

Referring now to the drawings, the numeral 1 identifies an electric locomotive which derives electrical energy for driving through trolley 2 from a trolley wire 3. At high speeds of the locomotive, which may be, for example, between 100 and 200 miles per hour, the air streaming takes place in the manner shown by the arrows in Fig. 1. The air passes in this connection far upwardly and produces by reason of the high speeds of the air streaming, considerable forces in the trolley wire which tend to cause the trolley wire to become separated from the trolleys. At the rear of the locomotive, the air streaming is again directed toward the tracks, and thereby opposite forces are produced. From a practical standpoint, however, the upward forces predominate because additional cars are usually coupled to the locomotive which prevent the air currents from being deflected downwardly.

Figure 2:
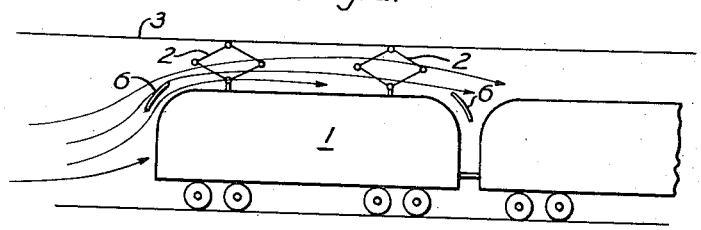
Fig. 2 is a view, in side elevation, of an electric locomotive constructed in accordance with my invention.
Figure 4:
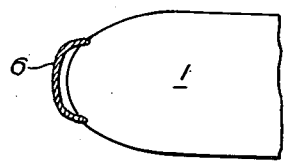
Fig. 4 is a view, partially in plan and partially in section, of a portion of the structure shown in Fig. 2.

In order to suppress the lifting force of the air currents on the trolley wire, auxiliary means are provided on the vehicle, according to the present invention, for so influencing the air streaming that its course is approximately parallel to the trolley wire. Basically, this may be attained in different manners, one exemplary embodiment being shown in Fig. 2. In the arrangement according to Fig. 2, the front end of the locomotive is provided with a leading wall part or auxiliary wing 6 which is disposed a certain distance in front of or near the locomotive and has a form conforming to the rounded front end of the locomotive. The leading wall portion or auxiliary wing 6 is in this connection so designed that it catches the air impinging on the front of the vehicle, and deflects it in such a way that its course is approximately parallel to the trolley wire. As shown in Fig. 4, the wing 6 may be so curved that its sides are secured to the end of the locomotive.

Preferably, the auxiliary wings or leading wall portions 6 are disposed on both ends of the locomotive and produce a suitable condition in the locomotive for both directions of travel. Under certain circumstances, the leading wall portions or auxiliary wings may be displaceable or capable of being retracted in such manner that the leading wall part following the direction of the movement of the locomotive may be rendered ineffective.

Another exemplary embodiment is shown in

Figure 3:
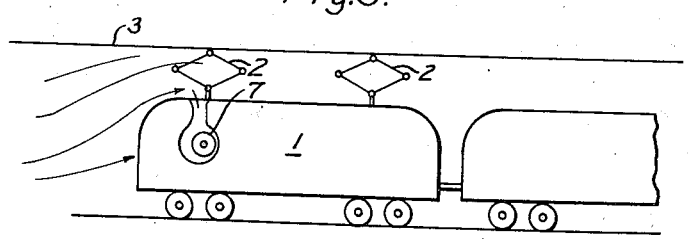
Fig. 3 is a view, similar to Fig. 2, showing another embodiment of the invention.

Fig. 3 of the drawings. In the embodiment illustrated in Fig. 3, a ventilator 7 is provided in the vehicle to draw the air into the vehicle from the region of the roof of the vehicle, thereby producing a vacuum at the top and front of the vehicle. In this manner the air currents between the trolley wire and the locomotive are so improved that the harmful lifting forces are not exerted on the trolley wire.

Figure 5:
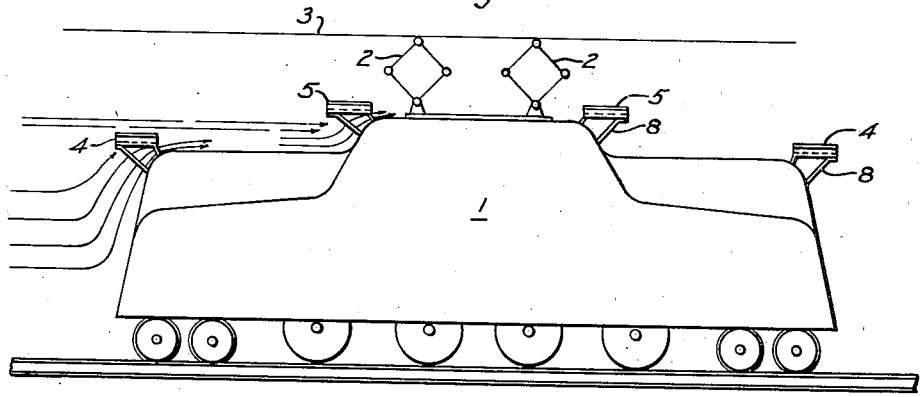
Fig. 5 is a view, in side elevation, of an electric locomotive, showing a modification of the invention.
Figure 6:
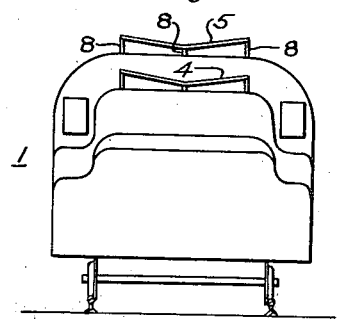
Fig. 6 is a view, in end elevation, of the locomotive shown in Fig. 5.

In the modification of the invention shown in Figs. 5 and 6, horizontal deflectors 4 and 5 are provided in place of the curved deflectors 6, the horizontal deflectors being more pleasing in appearance and just as effective on locomotives of certain types. With the particular design of locomotive illustrated, it will be found to be advantageous to provide two deflectors for each end of the locomotive, the deflectors 5 being mounted on the highest part of the locomotive cab, as shown. In this manner the air which strikes the lower part of the cab is deflected by the wings 4 and the air which strikes the upper part of the cab is deflected by the wings 5.

It is also of advantage to tip or elevate the outside edges of the wings in the manner illustrated in Fig. 6, thereby permitting a portion of the air to pass outwardly towards the sides of the locomotive and at the same time be deflected away from the trolley wire, which is located practically over the center of the locomotive. The wings may be supported by struts 8, secured to the locomotive cab.

The devices described herein have the additional advantage that as a consequence of their use, the harmful whirl formation of air usually resulting from rapid movement of a locomotive is considerably decreased. Therefore, considerable power may be saved, particularly at high speed operation.

Since numerous changes may be made in the above-described construction, and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In an electric locomotive driven by power from an overhead trolley wire, in combination, a locomotive body, and an auxiliary wing mounted on the front part of the body to so deflect the air currents developed by longitudinal movement of the locomotive relative to the trolley wire that their course is approximately parallel to the trolley wire.

2. In an electric locomotive driven by power from an overhead trolley wire, in combination, a locomotive body having a rounded end, and an auxiliary wing mounted on the front part of the body to so deflect the air currents developed by longitudinal movement of the locomotive relative to the trolley wire that their course is approximately parallel to the trolley wire, said wing being curved to conform to the rounded part of the body.

3. In an electric locomotive driven by power from an overhead trolley wire, in combination, a locomotive body, and an auxiliary wing disposed in a susbtantially horizontal plane at the front of the locomotive body for deflecting the air currents developed by longitudinal movement of the locomotive relative to the trolley wire away from the trolley wire.

4. In an electric locomotive driven by power from an overhead trolley wire, in combination, a locomotive body, and an auxiliary wing disposed in a substantially horizontal plane at the front of the locomotive body for deflecting the air currents developed by longitudinal movement of the locomotive relative to the trolley wire away from the trolley wire, the outside edges of said wing being at a higher elevation than the central part of the wing.

5. In an electric locomotive driven by power from an overhead trolley wire, in combination, a locomotive body, and a plurality of auxiliary wings disposed in substantially horizontal planes at different elevations on the locomotive body for deflecting the air currents developed by longitudinal movement of the locomotive relative to the trolley wire away from the trolley wire.

6. In an electric locomotive driven by power from an overhead trolley wire, in combination, a locomotive body, and auxiliary means mounted on the body and so positioned with respect to the front of the body that it cooperates with the front of the body to so influence the air currents between the locomotive body and the trolley wire that the trolley wire is not lifted by the air currents developed by longitudinal movement of the locomotive relative to the trolley wire.

KARL POHLHAUSEN.